(12) United States Patent
Maydiga et al.

(10) Patent No.: US 12,177,037 B2
(45) Date of Patent: Dec. 24, 2024

(54) VEHICLE CONTROL SYSTEM AND METHOD WITH PROTOCOL DATA UNIT MULTIPLEXING AND POST BUILD CONFIGURATION

(71) Applicant: GM Global Technology Operations LLC, Detroit, MI (US)

(72) Inventors: Sudhakaran Maydiga, Troy, MI (US); Steve DiBella, Troy, MI (US); John Patrick Saavedra Gonzaga, Macomb, MI (US); Subhash Vijaya Doddachikkaveeranna, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 18/166,085

(22) Filed: Feb. 8, 2023

(65) Prior Publication Data
US 2024/0267253 A1    Aug. 8, 2024

(51) Int. Cl.
*H04L 12/40* (2006.01)

(52) U.S. Cl.
CPC .... *H04L 12/40* (2013.01); *H04L 2012/40215* (2013.01); *H04L 2012/40273* (2013.01)

(58) Field of Classification Search
CPC .......... H04L 12/40; H04L 2012/40273; H04L 2012/40215
See application file for complete search history.

(56) References Cited

U.S. PATENT DOCUMENTS

| | | | | |
|---|---|---|---|---|
| 10,284,627 B2* | 5/2019 | Lang | ..................... | H04L 63/105 |
| 10,518,831 B2* | 12/2019 | Wright | ..................... | B60L 50/60 |
| 10,579,581 B2* | 3/2020 | Pitigoi-Aron | ....... | G06F 13/4291 |
| 11,055,111 B2* | 7/2021 | Zhu | ..................... | G06F 9/44505 |
| 11,057,352 B2* | 7/2021 | Guberman | ............ | H04W 12/04 |
| 11,387,852 B2* | 7/2022 | Banin | ..................... | H04L 25/49 |
| 2011/0231196 A1* | 9/2011 | Voto | ....................... | G10L 19/18 |
| | | | | 704/500 |

(Continued)

OTHER PUBLICATIONS

Li et al., Design on the Higher Layer Protocol of City-Bus Information Integrated Control Network Based on Embedded Component, 2009, IEEE, p. 575-579 (Year: 2009).*

(Continued)

*Primary Examiner* — McDieunel Marc
(74) *Attorney, Agent, or Firm* — Vivacqua Crane, PLLC

(57) ABSTRACT

A vehicle control system includes a transmitting electronic control unit for transmitting multiplexed protocol data units. The transmitting electronic control unit is enabled to transmit first and second protocol data units with corresponding first and second selector field values. A receiving electronic control unit is in electronic communication with the transmitting electronic control unit. The receiving electronic control unit is enabled to be programmed to operate in a first mode of operation or in a second mode of operation. The receiving electronic control unit is enabled to receive and process the first protocol data unit based on receipt of the first selector field value when operating in the first mode of operation and is enabled to receive and process the second protocol data unit based on receipt of the second selector field value when operating in the second mode of operation.

20 Claims, 7 Drawing Sheets

(56) References Cited

U.S. PATENT DOCUMENTS

2019/0356412 A1* 11/2019 Pitigoi-Aron ....... G06F 13/4282

OTHER PUBLICATIONS

Wang et al., Implementation of Modbus Communication Protocol based on ARM Coretx-M0, 2014, IEEE, p. 1-5 (Year: 2014).*
Siam et al., A combined power-controlled protocol with adaptive MIMO gains for wireless networks, 2007, IEEE, p. 1-10 (Year: 2007).*

* cited by examiner

VEHICLE CONTROL SYSTEM AND METHOD WITH PROTOCOL DATA UNIT MULTIPLEXING AND POST BUILD CONFIGURATION

INTRODUCTION

The present disclosure relates to a vehicle control system that includes multiplexing of protocol data units (PDUs) and post build configurable electronic control units (ECUs). The vehicle control system allows for the use of software with multiple variants corresponding to different vehicle variants and which provides backward compatibility with a prior software variant and ECU.

Modern vehicles typically include complex control systems that include numerous ECUs and embedded software for managing thousands of signals and controlling vehicle functions. Different signals and functions within a vehicle typically have varying communication requirements, such as in terms of the amount of information needed to be conveyed, required speed of communication, reliability, security needs, and the like. Some functions inside a car require comparatively simple communications. For example, pushing a button can be represented by a signal using a single bit that can be transmitted at a low bit rate. Classical CAN (control area network) technology is widely used for such signals. More than one signal can be mapped to one transmission frame for payload optimization.

The Automotive Open System Architecture (AUTOSAR) was created to standardize automotive software platforms. To create a level of abstraction for signals, AUTOSAR has introduced the concept of an AUTOSAR protocol data unit (PDU). With AUTOSAR, signals are no longer directly mapped to transmission frames but to technology agnostic PDUs that are transported within frames. An AUTOSAR PDU includes a combination of a CAN-ID (CAN identification) and the payload. Newer bus/network technologies such as CAN FD (control area network flexible data rate) and Ethernet have higher bandwidths for signal throughput, which is advantageous for the many signals involved with modern vehicle control systems.

Providing new or different signals and/or updating functionality for a vehicle control system may entail complex rerouting of signals, updated software, and redesign of one or more ECUs.

Thus, while vehicle control systems achieve their intended purpose, there is a need for a new and improved vehicle control system architecture and methods for designing and/or updating a vehicle control system wherein new software variants can be more easily designed and implemented.

SUMMARY

An improved vehicle control system takes advantage of PDUs that are multiplexed, with a multiplexed PDU having a corresponding selector field value, such that relevant PDUs can be received and processed by ECUs that are configured to handle those PDUs via corresponding selector field values. ECUs can be easily configured by having post build configuration functionality, i.e., by having several different identities (corresponding to different selector field values) that are either selectable or loadable post build, such as by flashing or reflashing. For example, an identity decider module may be enabled to select an identity upon startup, or a selected identity may be loadable for the ECU during the vehicle manufacturing process. This provides an improved method for design and implementation of a vehicle control system because of the simplicity, flexibility, and backward compatibility of new designs with prior versions, saving time and effort. Such a network control system allows for different software variants to be supported by a single ECU hardware build and optimizes network resources such as network load and latency.

According to several aspects, a method is disclosed for a vehicle control system. The method includes defining a first signal set and a second signal set to be transmitted via multiplexed protocol data units by a transmitting electronic control unit of a vehicle control system. The method includes generating the multiplexed protocol data units by determining, for the first signal set, a corresponding first selector field value and a first protocol data unit and determining, for the second signal set, a corresponding second selector field value and a second protocol data unit. The method includes mapping the first protocol data unit and corresponding first selector field value and the second protocol data unit and corresponding second selector field value to one or more frames for transmission and building a communication software stack to enable transmission of the one or more frames by the transmitting electronic control unit to a receiving electronic control unit of the vehicle control system. The method further includes determining a first version of the receiving electronic control unit and a second version of the receiving electronic control unit to be implemented by a corresponding post build configuration of the receiving electronic control unit, wherein the first version enables the receiving electronic control unit to receive and process the first protocol data unit based on the first selector field value and the second version enables the receiving electronic control unit to receive and process the second protocol data unit based on the second selector field value.

In another aspect, the method includes configuring the receiving electronic control unit post build based on a desired identity to enable operation of the first version of the receiving electronic control unit or the second version of the receiving electronic control unit.

In another aspect, the desired identity for the receiving electronic control unit is determined by an identity decider module.

In another aspect, configuring the receiving electronic control unit post build includes flashing.

In another aspect, mapping the first protocol data unit and corresponding first selector field value and the second protocol data unit and corresponding second selector field value to one or more frames for transmission uses dynamic multi-PDU to frame mapping.

In another aspect, the first and the second selector field values represent different variants of a vehicle.

In another aspect, the first and the second selector field values represent different model years of a vehicle.

In another aspect, mapping the first protocol data unit and corresponding first selector field value and the second protocol data unit and corresponding second selector field value to one or more frames for transmission includes I-PDU multiplexer packing or container PDU packing.

In another aspect, the first and the second selector field values are each predetermined.

In another aspect, the first and the second protocol data units are each a dynamic segment with varying length or position.

In another aspect, the receiving electronic control unit is not able to process the second protocol data unit when configured as the first version and is not able to process the first protocol data unit when configured as the second version.

In another aspect, a method for updating vehicle software includes defining a first signal set and a second signal set to be transmitted as multiplexed protocol data units by a transmitting electronic control unit of a vehicle control system. The method includes generating the multiplexed protocol data units by determining, for the first signal set, a first protocol data unit and corresponding first selector field value and determining, for the second signal set, a second protocol data unit and corresponding second selector field value. The method includes mapping the first protocol data unit and corresponding first selector field value and the second protocol data unit and corresponding second selector field value to one or more frames for transmission and building a communication software stack to enable transmission of the one or more frames by the transmitting electronic control unit to a receiving electronic control unit of the vehicle control system. Additionally, the method includes determining a first version of the receiving electronic control unit and a second version of the receiving electronic control unit to be implemented by a corresponding post build configuration of the receiving electronic control unit, wherein the first version enables the receiving electronic control unit to receive and process the first protocol data unit based on the first selector field value and the second version enables the receiving electronic control unit to receive and process the second protocol data unit based on the second selector field value. The method includes configuring the receiving electronic control unit post build to enable operation of the first version of the receiving electronic control unit or the second version of the receiving electronic control unit based on a desired identity and downloading the communication software stack to the post build configured receiving electronic control unit.

In another aspect, a vehicle control system is disclosed that includes a transmitting electronic control unit for transmitting multiplexed protocol data units, wherein the transmitting electronic control unit is enabled to transmit a first protocol data unit with a corresponding first selector field value and a second protocol data unit with a corresponding second selector field value. The vehicle control system further includes a receiving electronic control unit in electronic communication with the transmitting electronic control unit, wherein the receiving electronic control unit is enabled to be programmed to operate in a first mode of operation or in a second mode of operation, wherein the receiving electronic control unit is enabled to receive and process the first protocol data unit based on receipt of the first selector field value when operating in the first mode of operation and is enabled to receive and process the second protocol data unit based on receipt of the second selector field value when operating in the second mode of operation.

In another aspect, the vehicle control system includes a processor and a memory for storing instructions, wherein the processor is enabled to execute stored instructions in the memory to select whether the receiving electronic control unit is programmed to operate in the first mode of operation or in the second mode of operation.

In another aspect, the transmitting electronic control unit is connected to the receiving electronic control unit via a bus system that uses Ethernet technology or a controller area network with flexible data rate.

In another aspect, the first and the second selector field values represent different variants of a vehicle.

In a further aspect, the first and the second selector field values represent different model years of a vehicle.

In another aspect, the first and the second selector field values are each predetermined and static.

In another aspect, the first and the second protocol data units are each a dynamic segment with varying length or position.

In another aspect, the receiving electronic control unit is not able to process the second protocol data unit when operating in the first mode of operation and is not able to process the first protocol data unit when operating in the second mode of operation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
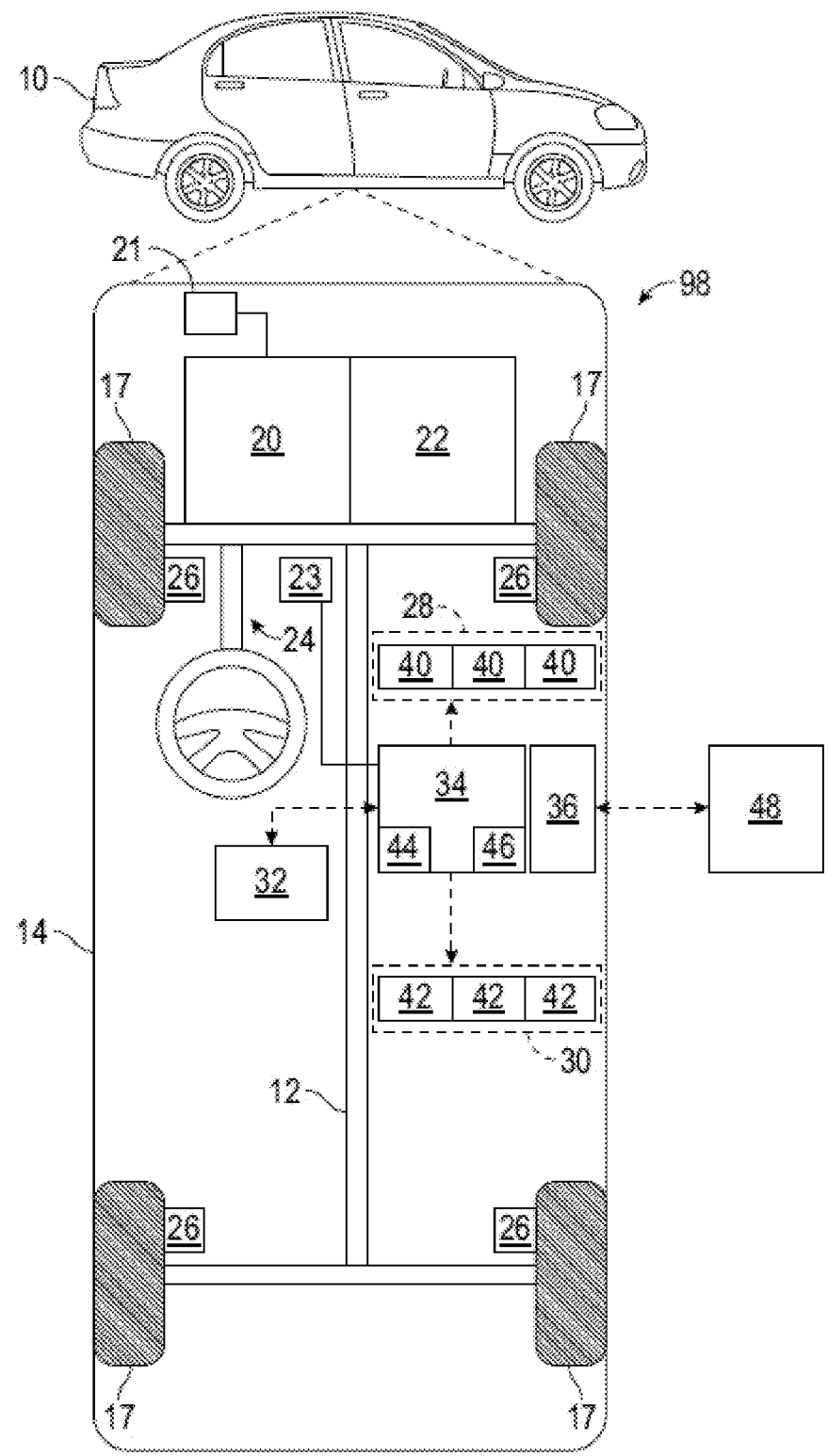
FIG. 1 is a schematic diagram of a vehicle having a vehicle control system according to an example.

As depicted in FIG. 1, a vehicle 10 generally includes a chassis 12, a body 14, and front and rear wheels 17. The body 14 is arranged on the chassis 12 and typically substantially encloses components of the vehicle 10. The body 14 and the chassis 12 may jointly form a frame. The wheels 17 are each rotationally coupled to the chassis 12 near a respective corner of the body 14. The vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., are also contemplated.

As shown, the vehicle 10 includes a vehicle control system 98 which is incorporated into the vehicle 10 for controlling different vehicle systems. In general, vehicle control system 98 is configured to receive sensor data from a sensor system 28, analyze the data using at least one controller 34, and generate control signals that are sent to the actuator system 30 for enabling control of different vehicle systems, such as a propulsion system 20, a transmission system 22, a steering system 24, and a brake system 26. The vehicle also includes at least one data storage device 32 and a communication system 36 for communication between the different vehicle systems and subsystems.

The propulsion system 20 may in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some examples, the steering system 24 may not include a steering wheel.

The sensor system 28 includes one or more sensors 40 (i.e., sensing devices) that sense conditions of the exterior environment and/or the interior environment of the vehicle 10. The sensors 40 are in communication with the controller 34 and may include, but are not limited to, one or more cameras (e.g., optical cameras and/or thermal cameras, such as one or more rear cameras and/or one or more front cameras), a speed sensor, one or more radar devices, one or more light detection and ranging (lidar) sensors, one or more ground penetrating radar (GPR) sensors, one or more global positioning system (GPS) devices, a steering angle sensor, ultrasonic sensors, one or more inertial measurement units (IMUs) and/or other sensors. Each sensor 40 is configured to detect one or more parameters, such as those related to the vehicle or its environment in the area surrounding the vehicle 10.

The sensor system 28 includes one or more Global Positioning System (GPS) devices configured to detect and monitor vehicle position related to route data (i.e., route information). The GPS device is configured to communicate with a GPS satellite to locate the position of the vehicle 10, such as with respect to a map of the area. The GPS device is in electronic communication with the controller 34. The sensor system 28 provides many signals to the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as temperature control, music, video, lighting, etc. (not numbered)

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by a remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The controller 34 includes multiple electronic control units (ECUs) that communicate with each other and other nodes over one or more suitable communication mediums and/or a combination of communication mediums, such as CAN, CAN FD, and/or Ethernet, and the like. ECUs can include micro-controllers running firmware or code to perform designated functions and to send messages to other ECUs within the vehicle. In examples, different ECUs in a vehicle may include some or all of the following: engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). ECUs with similar requirements and functional relations may be grouped together in domains, with specific ECUs that have been developed for the different domains, such as for infotainment, chassis and safety, powertrain, and body and security, or the like.

In general, the ECUs cooperate to process the sensor signals, perform logic, calculations, methods, and/or algorithms, and generate control signals to automatically control functions/features of the vehicle 10.

The communication module 36 facilitates communication between the ECUs and other devices included in the vehicle for monitoring and/or controlling various vehicle components.

The communication system 36 may also be configured to wirelessly communicate information between controller 34 and other entities 48, such as but not limited to, other vehicles (vehicle to vehicle "V2V" communication), infrastructure devices ("I2V" or "V2I" communication), remote systems, and/or personal devices. In an example, the communication system 36 is a wireless communication system configured to communicate via a wireless local area network (WLAN) using IEEE 802.11 standards, using cellular data communication, or using a dedicated short-range communications (DSRC) channel or the like. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle.

The controller 34 and/or ECUs include at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down.

The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing various logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control components of the vehicle 10 based on the logic, calculations, methods, and/or algorithms.

The vehicle 10 may also include a user interface 23, which may be a display screen in the dashboard and including touchscreen capability for user input. The user interface 23 is in electronic communication with the controller 34 and is configured to receive inputs by a user (e.g., vehicle operator or passenger). Accordingly, the controller 34 is configured to receive inputs from the user via the user interface 23, such as to provide information from the user to the controller 34. The controller may generate queries for a user to be displayed or generate sound via the user interface 23. The user interface 23 includes a display configured to display information to the user (e.g., vehicle operator or passenger) and may include one or more speakers to provide an audible notification to the vehicle operator. The user interface 23 may be a driver information center (DIC) capable of providing information to the vehicle operator of the vehicle 10.

Figure 2:
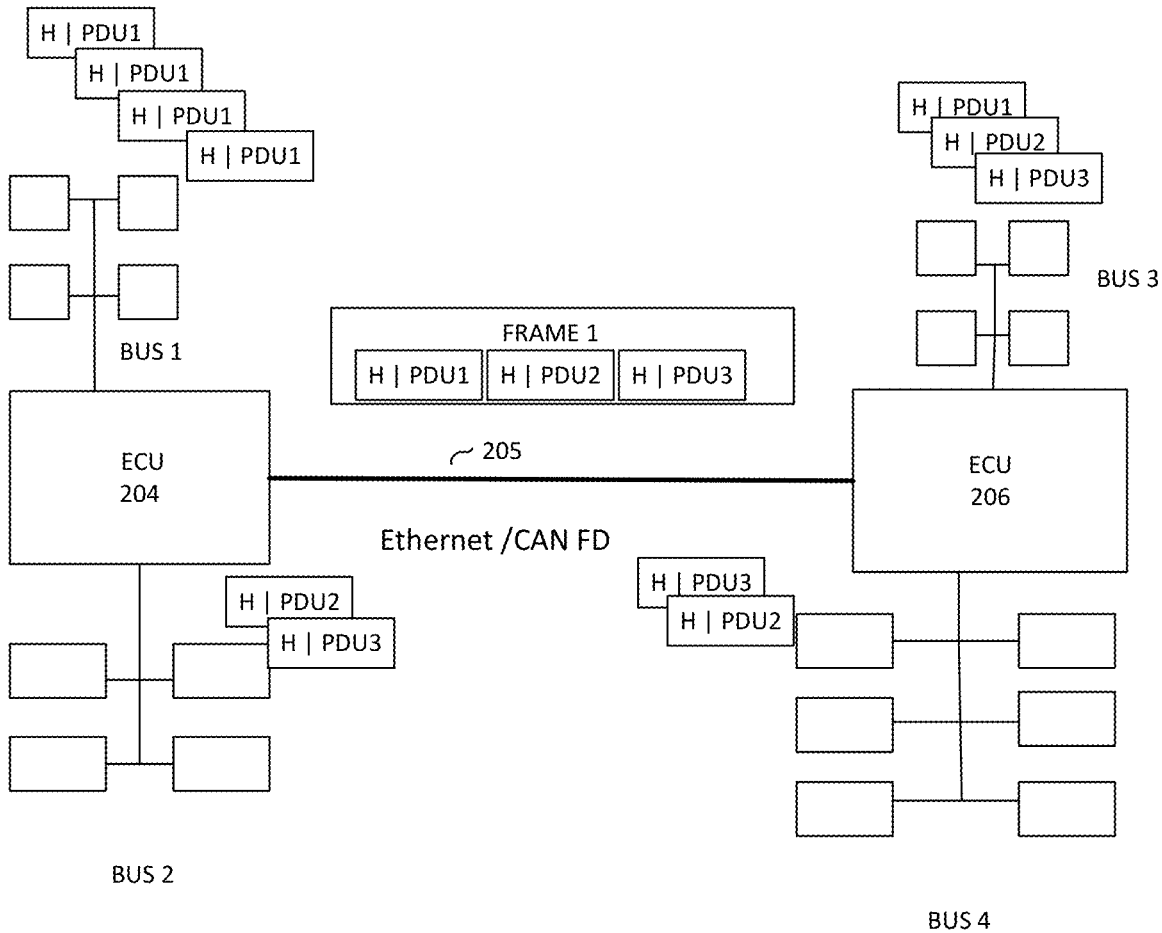
FIG. 2 is a portion of an example vehicle control system.

FIG. 2 illustrates a simplified portion (denoted as 200) of example vehicle control system 98. As shown, two ECUs 204, 206 are connected via a high-speed backbone network 205, which may use Ethernet or CAN FD networking technology. Each ECU 204, 206 has an associated domain or subdomain associated with it and each domain or subdomain may use a networking technology best suited to its specific transmission requirements. For example, as shown in FIG. 2, bus 1 and bus 2 transport PDUs via CAN and/or CAN FD technology between ECU 204 and modules 202. Bus 3 and bus 4 transport PDUs via CAN and/or CAN FD technology between ECU 206 and modules 208.

In a vehicle control system, signals are communicated as messages, which in some cases may be small in size, such as a switch which is on or off, or which in other cases may be much larger in size, such as video data from a vehicle camera. PDUs are abstractions between a signal and the data link frame, so signals are mapped to PDUs which are mapped to frames. Several signals may be mapped to one frame.

A CAN bus follows a message based protocol for transmitting a payload of up to eight bytes. With CAN FD, a vehicle network has larger payload (up to 64 bytes) and higher bit rates than CAN. CAN FD implements dynamic multi-PDU-to-frame mapping, which means that a position of a PDU within a frame is not static. The length of a PDU can be dynamic too. A header identifying the PDU is required to enable a receiver to extract the single PDUs. The header includes an ID and a DLC (data length code). To abstract the data link frame for the multi-PDU-to-frame mapping, a data link frame is modeled as a container PDU. With the dynamic construction of a frame, the triggering for transmission is determined at runtime, with different triggers defined. With dynamic multi-PDU-to-frame mapping, communications are independent of the network design. Adding a selector field to PDUs allows for flexibility in network system design. A transmitting ECU can be moved within a vehicle without modifying a receiving node. Unknown PDUs are simply skipped by a receiving node. Due to this, PDUs can be added to the vehicle without the need to update ECUs that are not affected by the new PDUs.

A corresponding selector field value may also be provided for certain PDUs to enable PDU multiplexing of those PDUs. Essentially, PDU multiplexing means using a selector field value to distinguish the contents of multiplexed PDUs from each other. As an example, ECU 204 may be enabled to transmit multiplexed PDUs, i.e., different PDUs with different corresponding selector field values, to ECU 206, wherein ECU 206 is able to extract relevant ones of the multiplexed PDUs based on a selector field value of the PDU and a version, identity, or mode of operation of the ECU which is associated with a selector field value. For example, transmitting ECU 204 is enabled to transmit a first protocol data unit with a corresponding first selector field value, such as 00, and a second protocol data unit with a corresponding second selector field value, such as 01. One version of ECU 206 associated with the first selector field value is enabled to receive and process the first protocol data unit. Another version of ECU 206 associated with the second selector field value is enabled to receive and process the second protocol data unit.

ECU 204 may dynamically pack PDUs to be multiplexed in one or more frames, with their corresponding selector field values, and transmit one or more frames via backbone network 205 (e.g., using Ethernet or CAN FD technology) to one or more receiving ECUs, such as ECU 206. ECU 206 is enabled to receive and process relevant ones of the multiplexed PDUs based on corresponding selector field values.

The use of multiplexed PDUs is advantageous to provide a way to update software without the complexity of rerouting PDUs. For example, assume that a new feature of a vehicle requires a new software module 202N that abstracts new or different sensor signals for processing by an ECU to provide the new feature. The protocol data units that are associated with the new set of sensor signals may be provided to a receiving ECU in a multiplexed way, and a receiving ECU for a vehicle with the new feature is programmed to extract and process relevant PDUs using an appropriate selector field value.

ECUs, such as ECU 206, may be configured according to a desired identity of multiple identities, wherein each identity is associated with different signal sets/PDUs and corresponding selector fields, such that a receiving ECU may be enabled to process PDUs that are relevant to it and ignore PDUs that are not relevant, based on corresponding selector field values.

The receiving ECU 206 may be configured as one of multiple identities (versions) post build. For example, each of the multiple identities may be associated with a different variant of a vehicle, such that the ECU 206 is usable with different sets of signals for different features for each of the different vehicle variants. For example, a first identity or version of the ECU 206 may be based on model year X of a vehicle, which has a certain set of signals for certain features. A second version may be based on a model year X+1, corresponding to a different set of signals, a third version may be based on model year X+2 with its set of signals, etc. Other vehicle variants besides model years are possible as well.

A desired identity may be selectable or loadable such that the receiving ECU may be configurable post build (i.e., the configuration of the receiving ECU may be done at a different/later time, such as to correspond with updated software for new or different features). In the case of a loadable post-build ECU, a desired identity may be loaded when the vehicle control system is manufactured such that at boot-time, the loaded configuration is used in the vehicle control system. In a selectable post-build, multiple configurations are loaded into the ECU during flashing. A ECU manager module of the control system 98 selects an identity at an initialization of a vehicle.

For a receiving ECU, the content of a frame with multiplexed PDUs is interpreted to provide appropriate separated PDUs considering the value of the selector field.

A receiving ECU that is configurable post build for multiple identities allows a receiving ECU to be changed to handle new or different sets of signals with their corresponding PDUs. With PDU multiplexing, an associated selector field enables a receiving ECU to extract relevant PDUs.

Figure 3:
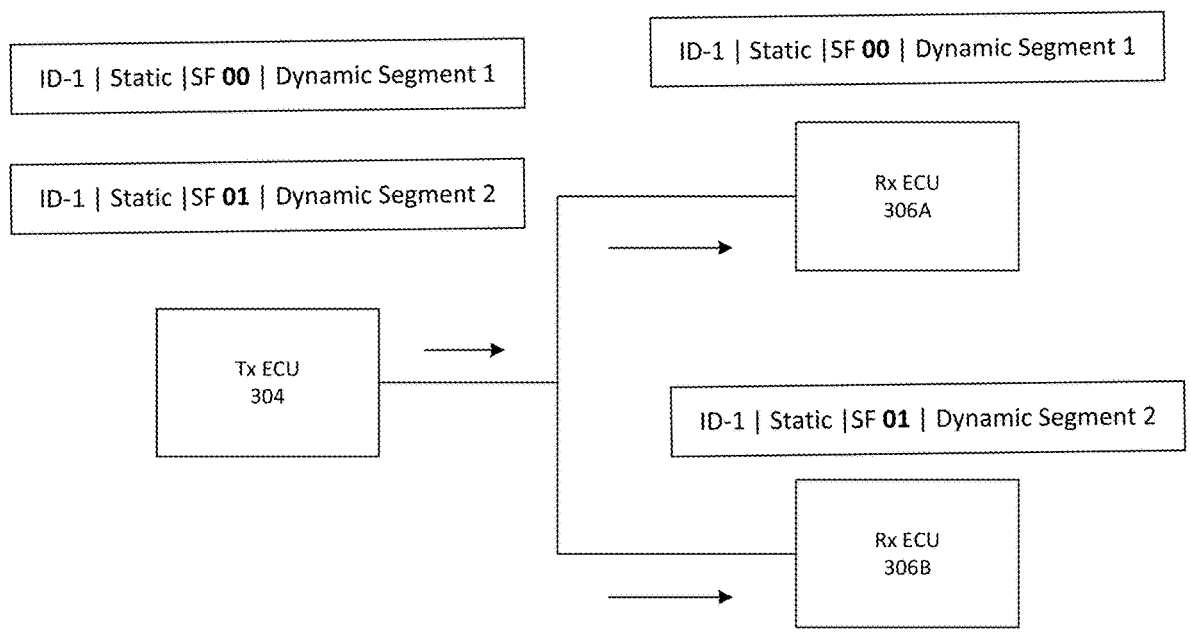
FIG. 3 is a diagram of I-PDU multiplexer packing in an example.

The vehicle control system may include an IPDU Multiplexer (IpduM) to enable standalone packing of PDUs, such as shown in FIG. 3. Transmitting ECU 304 is enabled to send a frame having an ID and a first selector field, such as 00, with a first dynamic segment of PDUs representing a first set of signals and send a frame with the same ID, but having a second selector field, such as 01, with a second dynamic segment of PDUs representing a second set of signals. On the receiving end, receiving ECU 306A has an identity for a first vehicle variant and is enabled to receive and process the first dynamic segment of PDUs based on the first selector field (00). Similarly, the receiving ECU 306B has an identify for a second vehicle variant and is enabled to receive and process the second dynamic segment of PDUs based on the second selector field (01).

Figure 4:
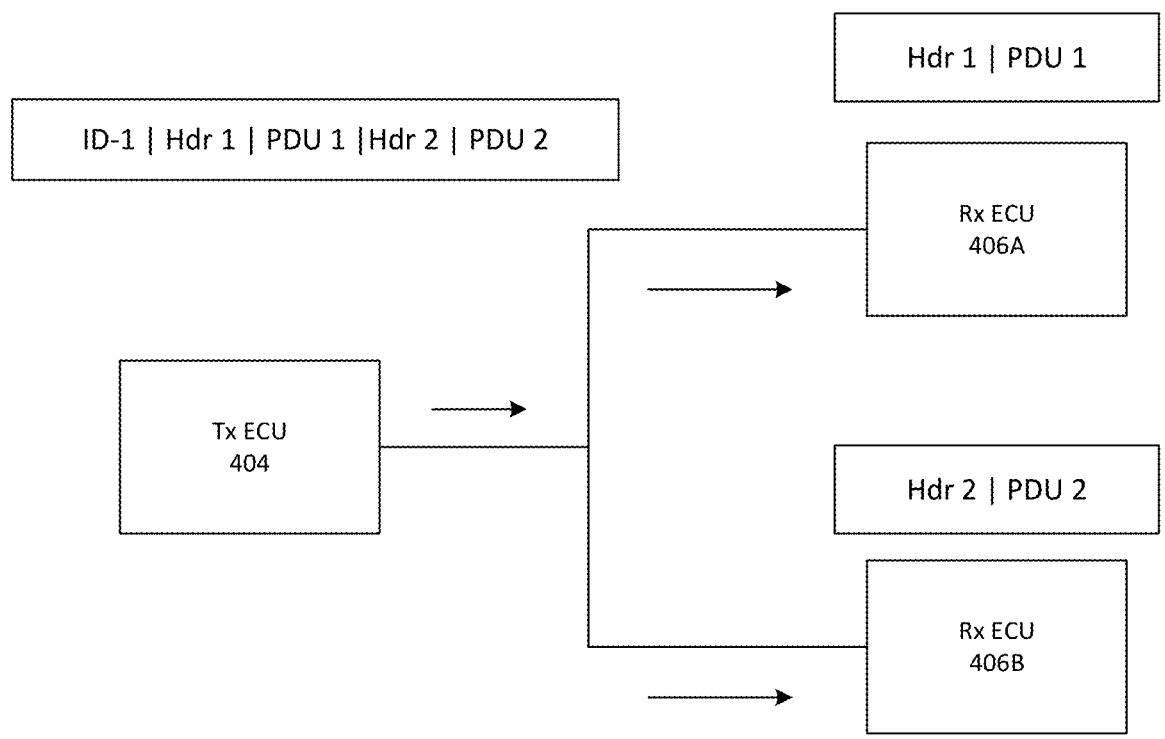
FIG. 4 is a diagram of container PDU packing in an example.

The vehicle control system 98 may include a container PDU packer, such as illustrated in FIG. 4. Transmitting ECU 404 is enabled to send a frame having multiple PDUs, with each PDU having a corresponding header with selector field data. PDU 1 with header 1 represents a first set of signals and PDU 2 with header 2 represents a second set of signals. On the receiving end, receiving ECU 406A has an identity for a first vehicle variant and is enabled to receive and process PDU 1 based on Header 1. Similarly, the receiving ECU 406B has an identify for a second vehicle variant and is enabled to receive and process PDU 2 based on Header 2.

Figure 5:
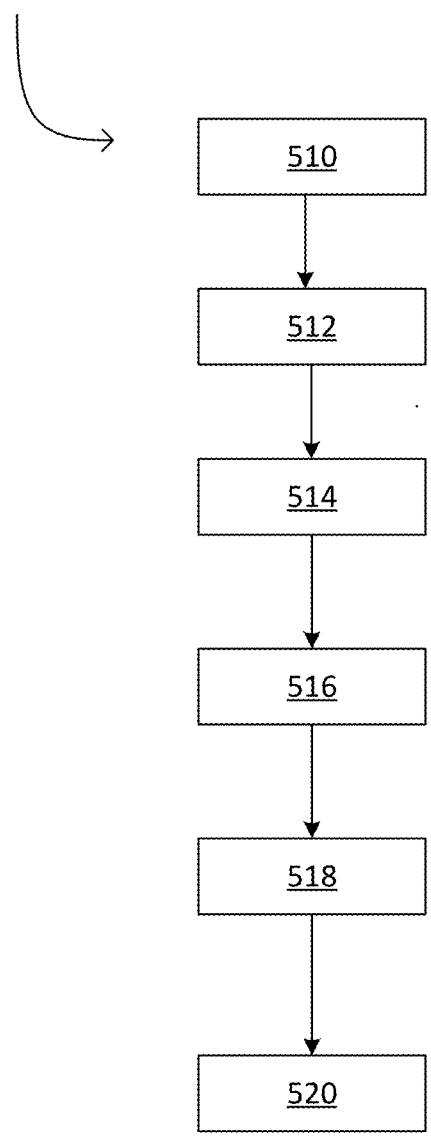
FIG. 5 is a flow chart of an example method for designing and updating a vehicle control system.

FIG. 5 is a flow chart of an example method for designing and/or updating a vehicle control system.

At a step 510, signals are mapped to PDUs using data in a signal database and a topology of the network. A signal database provides information regarding which nodes in a network are sending which messages and which nodes need to receive the messages. The signal database may be in an AUTOSAR system description format, with PDUs providing the abstraction layer between signals and messages. The network topology provides information on an arrangement of nodes (modules, ECUs, etc.) with respect to the others and their interconnections. For example, different sets of signals to be transmitted by a transmitting ECU to different versions of receiving ECUs can be determined.

Different vehicle variants using different sets of signals can be determined, with each variant assigned a corresponding predetermined selector field. For example, a vehicle of model year 1 may be assigned a 00 selector field, a vehicle of model year 2 may be assigned a selector field value of 01, a vehicle of model year 3 may be assigned a selector field value of 10, and a vehicle of model year 4 may be assigned a selector field value of 11. For a defined signal set for a vehicle of model year 1, a corresponding PDU is determined with the corresponding selector field value of model year 1. PDUs can be multiplexed for the different vehicle variants and multiple versions of receiving ECUs can be defined to extract relevant PDUs for the associated vehicle variant.

At step 512, a PDU multiplexer layout is determined, to associate different PDUs and selector field values with different versions of receiving ECUs that are post build configurable. The different versions may represent different model years of a vehicle. For example, a first version of the receiving ECU enables the receiving ECU to receive and process a first protocol data unit based on a first selector field value and a second version enables a receiving ECU to receive and process a second protocol data unit based on a second selector field value.

At step 514, the multiplexed PDUs with predefined selector field values are mapped to one or more frames for transmission, using static and/or dynamic fields, such as by using IPDUM packing or container packing with the different PDUs and selector fields.

At step 516, a communication software stack is built to enable transmission of the one or more frames by the transmitting ECU to a receiving ECU of the vehicle control system, for example, using AUTOSAR standards.

At step 518, a receiving ECU is configured post build with a desired identity to enable operation of one of multiple versions of the receiving ECU based on a desired identity, for example, based on a model year of the vehicle.

At step 520, the communication software stack may be loaded to the post build configured receiving ECU.

Process 500 can provide a useful way to update features of a vehicle via a software update for an ECU that can be reconfigured to handle new or different PDUs without having to provide new PDU routing and without having to design new hardware.

Figure 6:
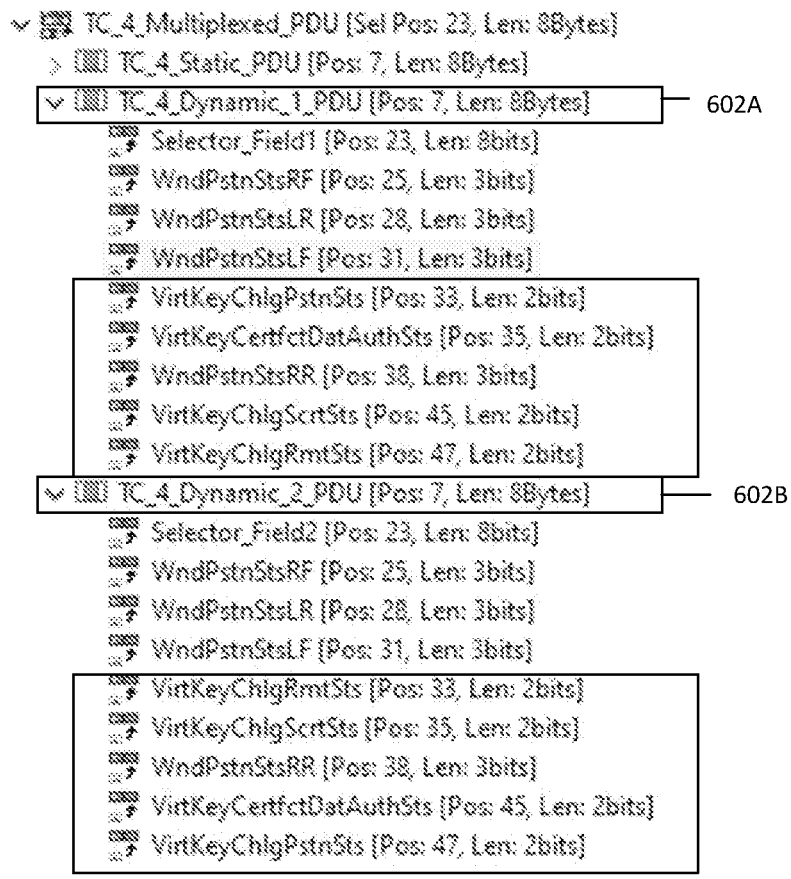
FIG. 6 is an example of associating a first set of signals with a first PDU and a corresponding selector field value and associating a second set of signals with a second PDU with a corresponding selector field value.
Figure 7:
FIG. 7 is another example of associating a first set of signals with a first PDU and a corresponding selector field value and associating a second set of signals with a second PDU with a corresponding selector field value.

FIGS. 6 and 7 are examples of associating a first set of signals with a first PDU and a corresponding selector field value and associating a second set of signals with a second PDU with a corresponding selector field value, which is useful for updating features of ECUs in different vehicle variants. For example, with respect to FIG. 6, first PDU 602A includes a first set of signals and second PDU 602B includes a second set of signals, which are the same signals as in the first set but with some of the signals rearranged in a different order. A first selector field value, such as 1, is associated with the first PDU 602A. A first receiving ECU is enabled to receive and process the first set of signals according to the first selector field value. Another selector field value, such as 2, is associated with the second set of signals (the different arrangement of signals) meant for a different configured second receiving ECU. The second receiving ECU is enabled to receive and process the second set of signals. In this way, the signals are mapped to PDUs and selector field values can be defined which maps the signals to ECUs of a corresponding vehicle variant, such as a model year.

Similarly, FIG. 7 is an example illustrating signal sets that are completely different for different vehicle variants. This may be useful to recycle a CAN ID (identification) for a set of signals that represents a feature that is obsolete in a new vehicle variant. First PDU 702A includes a first set of signals and second PDU 702B includes a completely different second set of signals, which represents a new group of signals, such as for a different vehicle feature. In this example, the first set of signals of PDU 702A may be associated with a feature that is no longer present in a new vehicle variant. Thus, a first selector field value, such as 1, is associated with the first PDU 702A. A first receiving ECU is enabled to receive and process the first set of signals according to the first selector field value. Another selector field value, such as 2, is associated with the second set of signals meant for a different configured second receiving ECU. The second receiving ECU is enabled to receive and process the second set of signals based on the second selector field value to enable the new vehicle feature.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method comprising:
defining a first signal set and a second signal set to be transmitted via multiplexed protocol data units by a transmitting electronic control unit of a vehicle control system;
generating the multiplexed protocol data units by determining, for the first signal set, a corresponding first selector field value and a first protocol data unit and determining, for the second signal set, a corresponding second selector field value and a second protocol data unit;
mapping the first protocol data unit and corresponding first selector field value and the second protocol data unit and corresponding second selector field value to one or more frames for transmission;
building a communication software stack to enable transmission of the one or more frames by the transmitting electronic control unit to a receiving electronic control unit of the vehicle control system; and
determining a first version of the receiving electronic control unit and a second version of the receiving electronic control unit to be implemented by a corresponding post build configuration of the receiving electronic control unit, wherein the first version enables the receiving electronic control unit to receive and process the first protocol data unit based on the first selector field value and the second version enables the receiving electronic control unit to receive and process the second protocol data unit based on the second selector field value.

2. The method of claim 1, further comprising:
configuring the receiving electronic control unit post build based on a desired identity to enable operation of the first version of the receiving electronic control unit or the second version of the receiving electronic control unit.

3. The method of claim 2, wherein the desired identity for the receiving electronic control unit is determined by an identity decider module.

4. The method of claim 2, wherein configuring the receiving electronic control unit post build includes flashing.

5. The method of claim 1, wherein mapping the first protocol data unit and corresponding first selector field value and the second protocol data unit and corresponding second selector field value to one or more frames for transmission uses dynamic multi-PDU to frame mapping.

6. The method of claim 1, wherein the first and the second selector field values represent different variants of a vehicle.

7. The method of claim 1, wherein the first and the second selector field values represent different model years of a vehicle.

8. The method of claim 1, wherein mapping the first protocol data unit and corresponding first selector field value and the second protocol data unit and corresponding second selector field value to one or more frames for transmission includes I-PDU multiplexer packing or container PDU packing.

9. The method of claim 1, wherein the first and the second selector field values are each predetermined.

10. The method of claim 1, wherein the first and the second protocol data units are each a dynamic segment with varying length or position.

11. The method of claim 1, wherein the receiving electronic control unit is not able to process the second protocol data unit when configured as the first version and is not able to process the first protocol data unit when configured as the second version.

12. A method for updating vehicle software comprising:
defining a first signal set and a second signal set to be transmitted as multiplexed protocol data units by a transmitting electronic control unit of a vehicle control system;
generating the multiplexed protocol data units by determining, for the first signal set, a first protocol data unit and corresponding first selector field value and determining, for the second signal set, a second protocol data unit and corresponding second selector field value;
mapping the first protocol data unit and corresponding first selector field value and the second protocol data unit and corresponding second selector field value to one or more frames for transmission;
building a communication software stack to enable transmission of the one or more frames by the transmitting electronic control unit to a receiving electronic control unit of the vehicle control system;
determining a first version of the receiving electronic control unit and a second version of the receiving electronic control unit to be implemented by a corresponding post build configuration of the receiving electronic control unit, wherein the first version enables the receiving electronic control unit to receive and process the first protocol data unit based on the first selector field value and the second version enables the receiving electronic control unit to receive and process the second protocol data unit based on the second selector field value;
configuring the receiving electronic control unit post build to enable operation of the first version of the receiving electronic control unit or the second version of the receiving electronic control unit based on a desired identity; and
downloading the communication software stack to the post build configured receiving electronic control unit.

13. A vehicle control system, comprising:
a transmitting electronic control unit for transmitting multiplexed protocol data units, wherein the transmitting electronic control unit is enabled to transmit a first protocol data unit with a corresponding first selector field value and a second protocol data unit with a corresponding second selector field value; and
a receiving electronic control unit in electronic communication with the transmitting electronic control unit, wherein the receiving electronic control unit is enabled to be programmed to operate in a first mode of operation or in a second mode of operation, wherein the receiving electronic control unit is enabled to receive and process the first protocol data unit based on receipt of the first selector field value when operating in the first mode of operation and is enabled to receive and process the second protocol data unit based on receipt of the second selector field value when operating in the second mode of operation.

14. The vehicle control system of claim 13, further comprising a processor and a memory for storing instructions, wherein the processor is enabled to execute stored instructions in the memory to:
select whether the receiving electronic control unit is programmed to operate in the first mode of operation or in the second mode of operation.

15. The vehicle control system of claim 13, wherein the transmitting electronic control unit is connected to the receiving electronic control unit via a bus system that uses Ethernet technology or a controller area network with flexible data rate.

16. The vehicle control system of claim 13, wherein the first and the second selector field values represent different variants of a vehicle.

17. The vehicle control system of claim 13, wherein the first and the second selector field values represent different model years of a vehicle.

18. The vehicle control system of claim 13, wherein the first and the second selector field values are each predetermined and static.

19. The vehicle control system of claim 13, wherein the first and the second protocol data units are each a dynamic segment with varying length or position.

20. The vehicle control system of claim 1, wherein the receiving electronic control unit is not able to process the second protocol data unit when operating in the first mode of operation and is not able to process the first protocol data unit when operating in the second mode of operation.

* * * * *